United States Patent
Bodin et al.

(10) Patent No.: US 8,393,072 B2
(45) Date of Patent: Mar. 12, 2013

(54) METHOD FOR PRODUCING A ROTARY ELECTRIC MACHINE STATOR

(75) Inventors: Denis Bodin, Saint Martin Boulogne (FR); Jean-Pierre Chochoy, Cremarest (FR); Alain Defebvin, Cormont (FR); Michel Jaze, Frencq (FR); Denis Even, Paris (FR)

(73) Assignee: Valeo Equipements Electriques Moteur, Creteil (FR)

( * ) Notice: Subject to any disclaimer, the term of this patent is extended or adjusted under 35 U.S.C. 154(b) by 470 days.

(21) Appl. No.: 12/160,662

(22) PCT Filed: Jan. 15, 2007

(86) PCT No.: PCT/FR2007/050648
§ 371 (c)(1),
(2), (4) Date: Jun. 23, 2010

(87) PCT Pub. No.: WO2007/080353
PCT Pub. Date: Jul. 19, 2007

(65) Prior Publication Data
US 2010/0259124 A1    Oct. 14, 2010

(30) Foreign Application Priority Data

Jan. 16, 2006  (FR) ...................................... 06 50141
Jan. 15, 2007  (WO) ................. PCT/FR2007/050648

(51) Int. Cl.
*H02K 15/00*  (2006.01)
(52) U.S. Cl. ................................ 29/596; 29/598; 29/606
(58) Field of Classification Search .................... 29/596, 29/598, 606, 609, 735; 310/68 B, 180, 184, 310/195, 206–208, 239, 263
See application file for complete search history.

(56) References Cited

U.S. PATENT DOCUMENTS

| | | | |
|---|---|---|---|
| 5,998,903 | A | 12/1999 | Umeda et al. |
| 6,009,618 | A | 1/2000 | Takahata et al. |
| 6,886,236 | B2 * | 5/2005 | Higashino et al. ............. 29/596 |
| 7,011,266 | B2 | 3/2006 | Hashimoto et al. |
| 7,224,093 | B2 | 5/2007 | Abadia et al. |
| 7,311,284 | B2 | 12/2007 | Hashimoto et al. |
| 7,337,525 | B2 | 3/2008 | Ueda et al. |

(Continued)

FOREIGN PATENT DOCUMENTS

| | | |
|---|---|---|
| DE | 10306147 A1 | 8/2004 |
| EP | 0881752 A1 | 12/1998 |

(Continued)

*Primary Examiner* — Thiem Phan
(74) *Attorney, Agent, or Firm* — Jacox, Meckstroth & Jenkins

(57) ABSTRACT

A method of producing a stator for a rotary electrical machine comprising a body in which axial recesses are produced and comprising a plurality of conductors arranged in the recesses, which comprises a step of depositing conductors on a linear support that comprises transverse recesses, comprising a first phase of depositing conductors in the recesses in the support in order to form a first layer of conductors, and a second phase of depositing conductors in the recesses, in order to form a second layer of conductors that is arranged vertically above the first layer; the first deposition phase and the second deposition phase consists of depositing one and the same conductor on the linear support.

The invention also proposes an arrangement of a set of conductors on a linear support obtained at the end of the deposition step.

9 Claims, 11 Drawing Sheets

U.S. PATENT DOCUMENTS

| | | |
|---|---|---|
| 7,339,294 B2 | 3/2008 | Oohashi et al. |
| 7,367,106 B2 | 5/2008 | Becherucci et al. |
| 2001/0019234 A1* | 9/2001 | Murakami et al. ............ 310/180 |
| 2002/0158523 A1 | 10/2002 | Abadia et al. |
| 2003/0034703 A1 | 2/2003 | Oohashi et al. |
| 2004/0046476 A1 | 3/2004 | Becherucci et al. |
| 2004/0207282 A1 | 10/2004 | Ueda et al. |
| 2005/0061907 A1 | 3/2005 | Hashimoto et al. |
| 2005/0133655 A1 | 6/2005 | Hashimoto et al. |
| 2005/0194844 A1 | 9/2005 | Becherucci et al. |
| 2007/0180682 A1 | 8/2007 | Ueda et al. |

FOREIGN PATENT DOCUMENTS

| | | |
|---|---|---|
| EP | 1109292 A2 | 6/2001 |
| EP | 1109294 A2 | 6/2001 |
| EP | 1286045 A2 | 2/2003 |
| EP | 1372242 A2 | 12/2003 |
| EP | 1469579 A1 | 10/2004 |
| FR | 2866996 A1 | 9/2005 |
| FR | 2879855 A1 | 6/2006 |
| JP | 55094567 A | 7/1980 |
| JP | 63171140 | 7/1988 |
| WO | 0169762 A1 | 9/2001 |

* cited by examiner

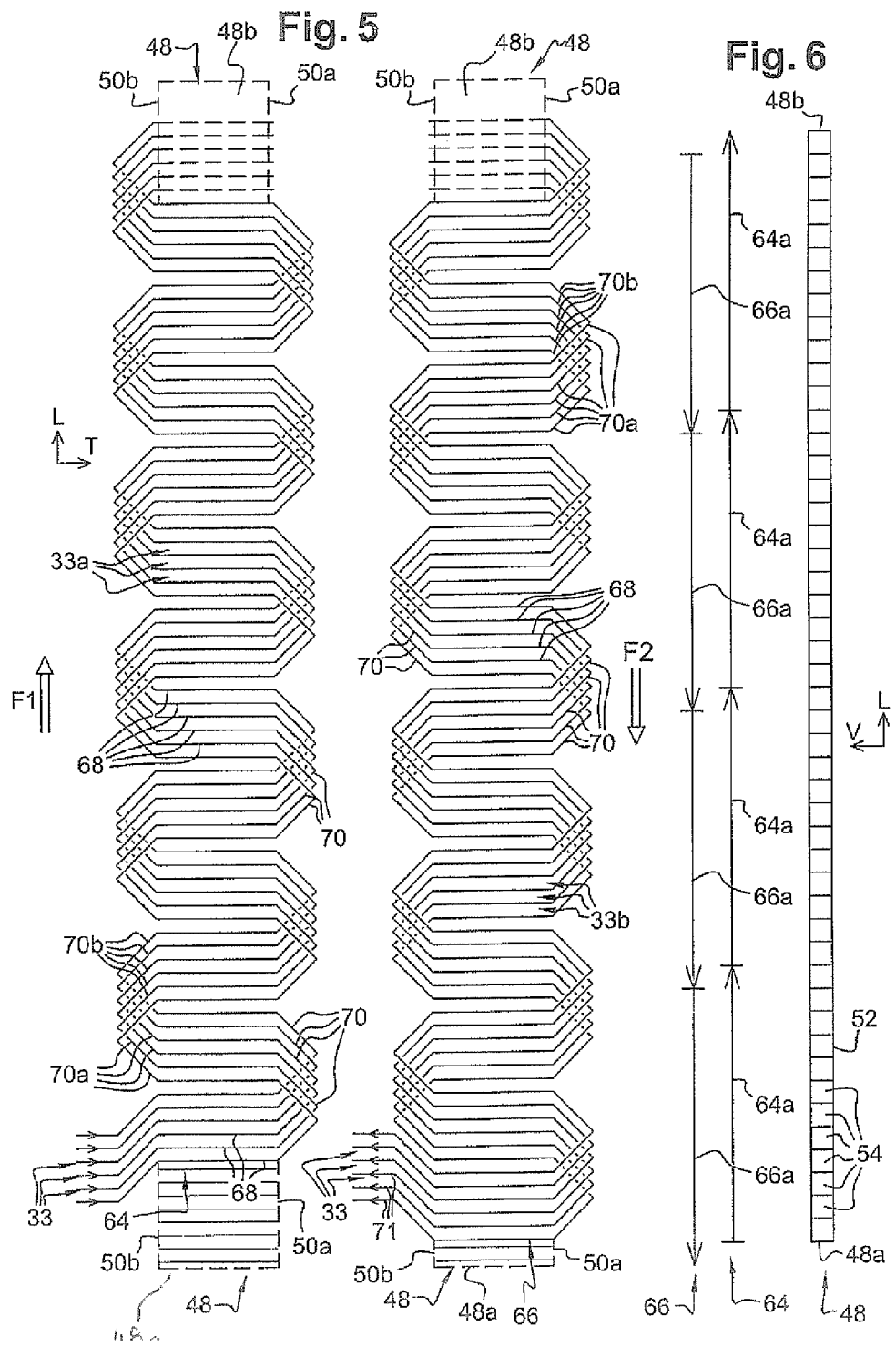

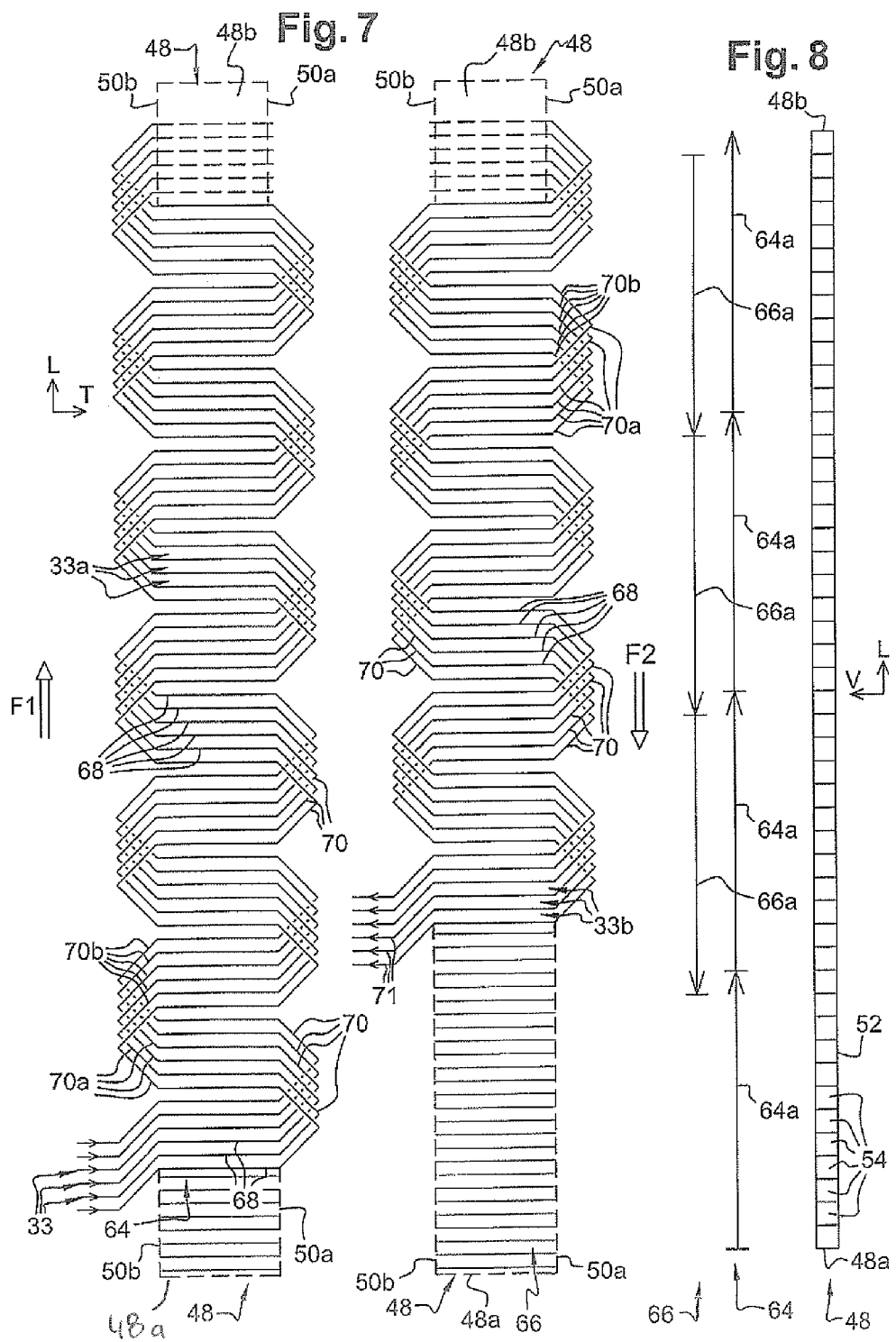

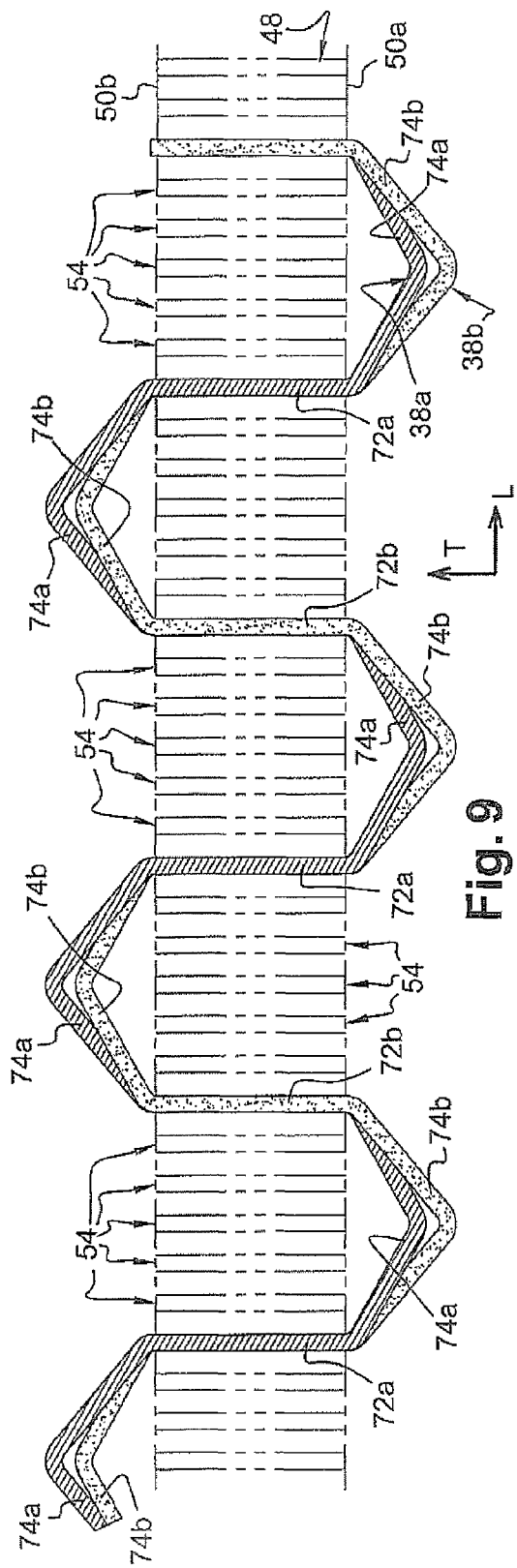
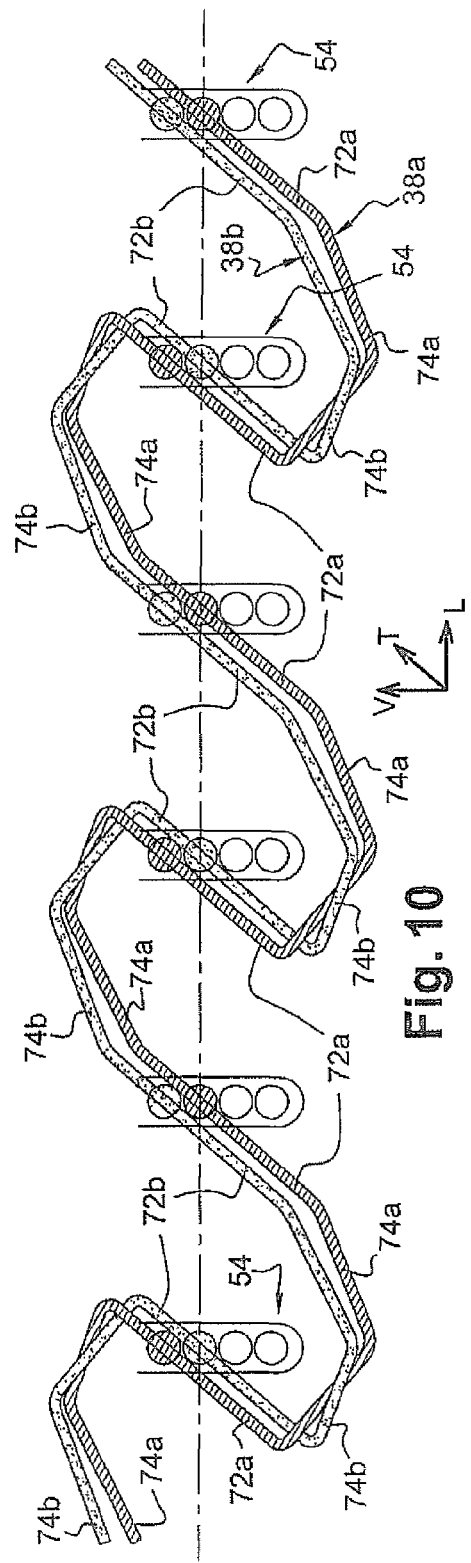
Fig. 9
Fig. 10

METHOD FOR PRODUCING A ROTARY ELECTRIC MACHINE STATOR

CROSS-REFERENCE TO RELATED APPLICATIONS

This application claims priority to PCT Application PCT/FR2007/050648 filed Jan. 15, 2007 and also to French Application No. 0650141 filed Jan. 16, 2006, which applications are incorporated herein by reference and made a part hereof.

BACKGROUND OF THE INVENTION

1. Field of the Invention

The invention proposes a method for producing a stator for a rotary electrical machine having a compact coil and having an optimized coefficient of filling of the recesses.

The invention proposes more particularly a method for producing a stator for a rotary electrical machine comprising an annular body in the internal cylindrical face of which there are produced axial recesses and comprising a plurality of phase windings consisting of conductors arranged in associated recesses in the body, of the type that comprises a step of depositing conductors on a linear support and two transfer steps.

The invention also concerns an arrangement of conductors on the linear support.

2. Description of the Prior Art

In this known method there are performed a step of depositing conductors on a linear support with a principal longitudinal orientation, the top face of which comprises transverse recesses, comprising a first phase of depositing conductors in the recesses, so as to form a first layer of conductors, a first step of transferring the conductors, from the linear support, onto an annular support with transverse principal axis whose external cylindrical face comprises transverse recesses distributed angularly about the transverse principal axis of the annular support, so that the two layers of conductors form two coaxial spirals on the annular support, and a second step of transferring the conductors from the annular support onto the body of the stator.

It may be thought to produce the coil of the stator from two layers of superimposed conductors.

More precisely it may be thought to carry out a second phase of depositing conductors in the recesses, so as to form a second layer of conductors that is arranged vertically above the first layer.

This arrangement makes it possible to reduce the length of the linear support, which is determined according to the total number of recesses in the linear support.

Thus, by producing the windings by forming two layers of conductors on the linear support, the total length of the linear support is roughly divided by two compared with the length of the linear support on which the windings are formed only from a single layer of conductors.

According to this embodiment the two deposition phases of the method are independent of each other so that, for each winding on the stator, the step of depositing the conductors consists of consecutively depositing two distinct conductors on the linear support.

Each conductor is deposited on the linear support by means of a deposition head that describes, with respect to the linear support, a roughly sinusoidal movement from upstream to downstream during each deposition phase.

Each deposition phase therefore comprises a period of depositing the conductor, followed by a period of return of the deposition head during which the deposition head is not used. Such a method thus includes dead times that extend the total time taken for producing the stator.

In addition, the coil produced by such a method then comprises four coil supply lengths for each winding, each length forming one end of one of the two conductors, that is to say double compared with a coil produced from a single layer of conductors, which consequently increases the weight and complexity of the stator in particular.

SUMMARY OF THE INVENTION

The aim of the invention is to propose a method of producing a stator for a rotary electrical machine making it possible to produce the coil from two layers of conductors, for which the time taken for producing the stator is reduced compared with the method according to the prior art and for which the final product has a simplified structure.

For this purpose, the invention proposes a method of the type described above in which on the one hand provision is made for a second phase of depositing the conductors in the recesses in the linear support, so as to form a second conductive layer, which is arranged vertically below the first layer, and secondly, for each winding, the first deposition phase and the second deposition phase consist of depositing one and the same conductor on the linear support, so that a first portion of the conductor partly forms the first layer of conductors and a second portion of the conductor partly forms the second layer of conductors According to other characteristics of the method according to the invention taken in isolation or in combination:

the first deposition phase and the second deposition phase each consist, for each conductor, of successively filling the recesses in the linear support, which are associated with the conductor, by introducing a roughly rectilinear transverse length of the conductor into an associated recess, folding and/or curving the conductor in order to form a longitudinal length that is situated transversely opposite a lateral vertical longitudinal face of the linear support, and introducing a consecutive transverse length into a consecutive associated recess, so that the conductor forms longitudinal undulations comprising a succession of transverse lengths that are received in the associated recesses and longitudinal lengths that are arranged alternately on each side of the linear support, for each conductor, the first deposition phase consists of successively filling the associated recesses from upstream to downstream and the second deposition phase consists of successively filling the associated recesses from downstream to upstream;

the second deposition phase is implemented continuously after the first deposition phase, so that the two portions of the conductor are connected together at a downstream end of the linear support;

during the deposition step, all the conductors associated with the windings are deposited simultaneously on the longitudinal support so that, at the end of the winding step, the first portions of the conductors that form the first layer of conductors are roughly parallel and the second portions of the conductors that form the second layer of conductors are roughly parallel;

the first transfer step consists of successively transferring the transverse lengths that are received in the recesses in the linear support to the recesses in the annular support, by running the annular support on the linear support, and consists of progressively transferring the transverse lengths of the conductors from a downstream end recess of the linear support as far as an upstream end recess in the linear support;

for each conductor, the deposition step consists of simultaneously depositing two electrically conductive wires on the linear support that form the conductor.

The invention also proposes an arrangement of a set of conductors on a linear support obtained at the end of the deposition step of the aforementioned method, the conductors being able to be transferred onto a body of a stator, so as to form a plurality of windings, in which the horizontal top face of the linear support comprises a series of longitudinally aligned transverse recesses, each recess receiving at least one length of each conductor associated with a single winding of the stator, in which each conductor comprises a succession of transverse lengths arranged in associated recesses in the linear support, and lateral lengths that are arranged on each side of the linear support, characterized in that each winding is formed by a single conductor, a first portion of which partly forms a first bottom layer and a second portion of which partly forms the second layer.

According to other characteristics of the arrangement according to the invention taken in isolation or in combination:

the two ends of each conductor are arranged close to an upstream end of the linear support;

for two consecutive recesses associated with a conductor, each receiving a transverse length of the first portion and a transverse length of the second portion of the conductor, the two transverse lengths of the first portion that are received in these two recesses are connected together by a bottom lateral length that is arranged transversely on a first side of the linear support, and the two transverse lengths of the second portion that are received in these two recesses are connected together by a top lateral length that is arranged transversely on the other side of the linear support, with respect to the bottom lateral length;

the length of the transverse lengths situated close to the downstream end of the linear support is less than the length of the transverse lengths situated close to the upstream end of the linear support;

in the first layer of conductors, and in two adjacent recesses in the linear support that each receive a transverse length of the associated conductor, the longitudinal length that extends downstream the transverse length that is received in the upstream recess of the two adjacent recesses overlaps the longitudinal length that extends downstream the transverse length that is received in the downstream recess of the two adjacent recesses;

in the second layer of conductors, and in two adjacent recesses in the linear support that each receive a transverse length of the associated conductor, the longitudinal length that extends upstream the transverse length that is received in the downstream recess of the two adjacent recesses overlaps the longitudinal length that extends upstream the transverse length that is received in the upstream recess of the two adjacent recesses;

each conductor comprises a pair of electrically conductive wires that are adjacent;

for each conductor, the two wires form complementary axial undulations that are transversely interleaved, so that one of the two wires is situated transversely above the other.

Other characteristics and advantages of the invention will emerge from a reading of the detailed description that follows for understanding, from the accompanying figures and from the claims.

BRIEF DESCRIPTION OF THE ACCOMPANYING DRAWINGS

FIG. 5 is a schematic representation of the two layers of conductors obtained at the end of the first deposition step, making it possible each to obtain the same number of turns;

FIG. 6 is a lateral view of the arrangement of the layers of conductors depicted in FIG. 5 on the linear support;

FIG. 7 is a view similar to that in FIG. 5, in which the layers of conductors make it possible to obtain different numbers of turns;

FIG. 8 is a lateral view of the arrangement of the layers of conductors depicted in FIG. 7 on the linear support;

FIG. 9 is view in detail of the arrangement of two wires forming the same conductor on the linear support, showing the relative position of the portions of two wires with respect to each other;

FIG. 10 is a schematic representation in perspective of the two wires depicted in FIG. 9;

DETAILED DESCRIPTION OF PREFERRED EMBODIMENTS

For the description of the invention, the orientations according to the references indicated in the figures will be adopted non-limitingly.

In the description that follows, identical, similar or analogous elements will be designated by the same reference figures.

Figure 1:
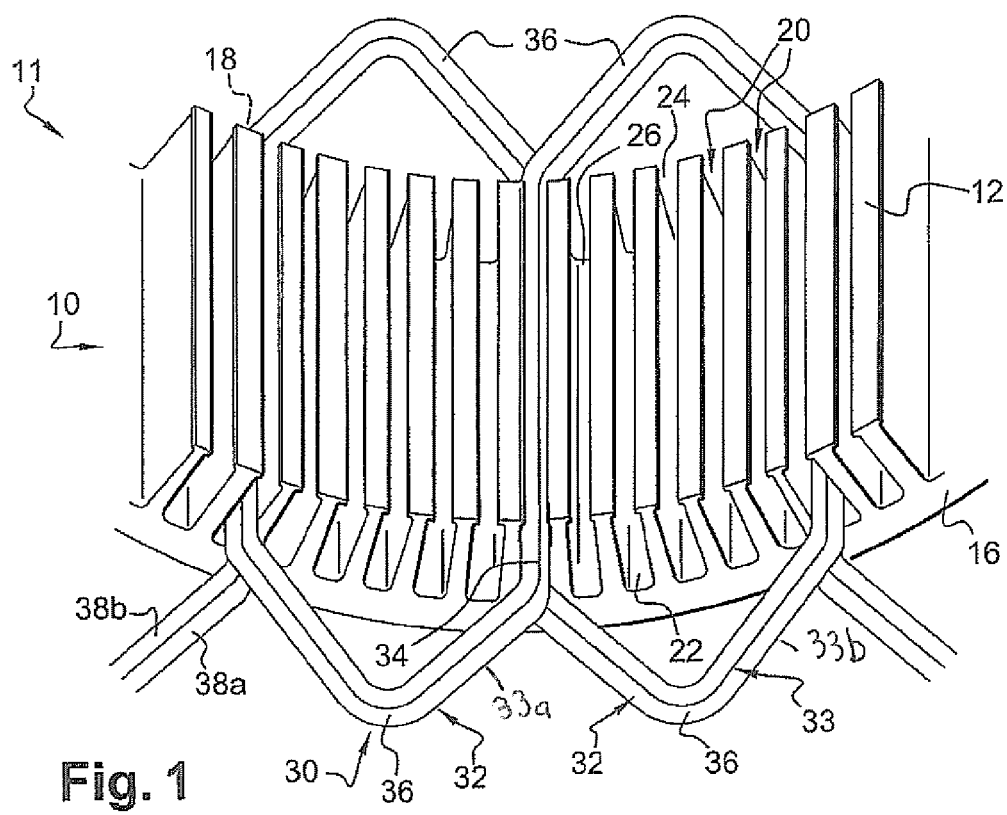
FIG. 1 is a partial view in perspective of the inside of a stator in which the conductive wires are deposited in accordance with the invention.

FIG. 1 depicts a partial view of a polyphase stator 11 for a rotary electrical machine that comprises principally a body 10 in which there are mounted several phase windings 30 that constitute the coil of the stator. This stator 11 is intended to surround a rotor (not shown for more clarity) that the rotary electrical machine includes.

Here the body 10 is produced so that it is able to receive six similar phase windings, and a single phase winding 30 has been shown in FIG. 1.

The rotary machine is for example an alternator or an alternator/starter of the polyphase type. This machine is preferably intended to be used in a motor vehicle.

It will be recalled that an alternator/starter is a rotary electric machine able to work reversibly, firstly as an electrical generator in alternator function, and secondly as an electric motor, in particular to start the thermal engine of the motor vehicle. Such an alternator/starter is described for example in the document WO-A-01/69762, corresponding to U.S. Pat. No. 7,224,093 which is incorporated herein by reference and made a part hereof and to which reference should be made for more information.

Thus, in one embodiment, the rotor of the rotary electrical machine is a claw rotor, or in a variant a rotor with projecting poles as described in this document WO-A-01/69762, to which reference should be made for more information.

Figure 2:
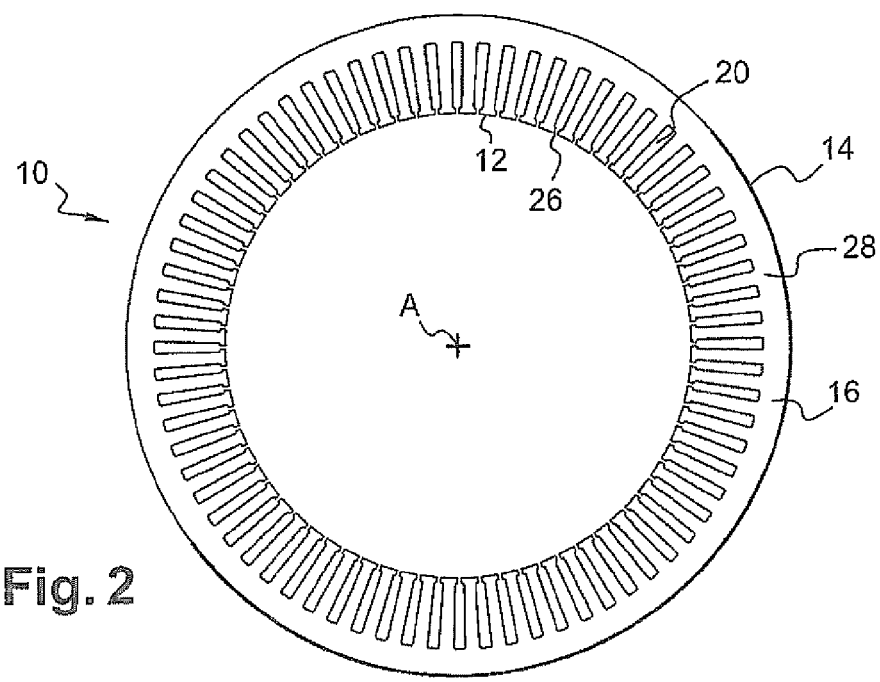
FIG. 2 is an end view of the stator body depicted in FIG. 1.

FIG. 2 depicts the body 10 of the stator 11 depicted in FIG. 1. The body 10 has an annular cylindrical shape with an axial axis of symmetry "A" and consists of an axial stack of flat metal sheets in order to reduce eddy currents. The body 10 is thus commonly referred to as a "packet of metal sheets".

The axis A also constitutes the axial axis of symmetry of the rotor and of the rotary electrical machine of the polyphase type, a small air gap existing between the internal periphery of the stator 11 and the external periphery of the rotor of the rotary electrical machine.

Hereinafter the orientations directed orthogonally to the axis "A" and that are secant with the axis "A" will be termed radial orientations. The orientations that are orthogonal both to the axis "A" and to a radial orientation will be termed transverse orientations.

The body 10 is annular in shape and is delimited radially by an internal cylindrical face 12 and by any external cylindrical face 14, and is delimited axially by a bottom axial end radial face 16 and by a top axial end radial face 18 (FIG. 1).

The faces 12 and 14 constitute respectively the internal periphery and the external periphery of the body 10.

Here the faces 12 and 14 are cylindrical, the body 10 being fixed in the casing of the machine by means of screws or tie rods as described in the document WO-A-01/69762. In a variant only the face 12 is cylindrical, the face 14 being in a variant for example in the form of a barrel. This face 14 can comprise projecting lugs for fixing it to the casing of the machine.

The body 10 is here cylindrical in shape at its internal periphery.

This body 10 comprises axially oriented recesses 20 that open out axially in the bottom 16 and top 18 axial end radial faces of the body 10 by means of front 22 and rear 24 axial orifices.

The recesses 20 are here of the semi-closed type and are therefore open radially in the internal cylindrical face 12 of the body 10 by means of an axial groove 26 that extends from the bottom radial face 16 as far as the top radial face 18. The transverse width of each axial groove 26 is less than the width of the associated notch 20.

The recesses 20 are all identical and are for example 72 in number. They are distributed angularly in a regular manner about the axis "A" of the body 10.

Thus, when the rotor of the machine is a claw rotor comprising in a known fashion two magnet wheels, each magnet wheel comprises six claws. The rotor therefore comprises twelve poles at the rate of one pole per claw and the body 10 of the stator 11 carries six phases.

The recesses 20 here have parallel edges, and have a bottom and are therefore blind.

The solid external annular portion of the body 10 in which the recesses 20 do not extend is called the casing 28.

To form the stator 11, several phase windings 30 are mounted in the body 10 in order to form the coil of the stator 11.

The invention will be described with reference to a stator 11 whose coil comprises six phase windings 30, also referred to as a "hexaphase" stator.

The invention is however applicable to a stator comprising a different number of phase windings, and in particular "three-phase" stators comprising three phase windings 30. The body 10 then comprises for example 36 recesses 20 when the claw rotor comprises twelve claws or 48 recesses 20 when the claw rotor comprises sixteen claws.

The number of recesses is a multiple of the number of claws of the rotor or in general terms the number of poles of the rotor.

In the prior art it has already been proposed to produce the windings by means of conductive segments connected together by soldering. This solution assists a high filling rate for the recesses 20 but requires many soldering operations.

In the present invention these many soldering operations are avoided whilst keeping the advantages of a solution with conductive segments, in particular high filling rate for the recesses, low ripple level in the induced current, good discharge of the heat and low acoustic noise.

In addition, the method of producing the stator according to the invention is more flexible and requires a small amount of time in changing production runs.

In the invention each phase winding 30 comprises undulating turns 32 formed by an electrical conductor 33, which are stacked radially.

More precisely each conductor 33 is mounted in an undulating manner in the recesses 20, here with parallel edges, and each turn 32 corresponds to a turn of the body 10.

In the example embodiment depicted each phase winding 30 and therefore a conductor 33 is composed of two wires 38a, 38b in parallel.

As is known the conductor 33 comprises an electrically conductive element, for example made from copper, surrounded by at least one electrically insulating layer such as enamel.

FIG. 1 depicts only two turns 32 of a phase winding 30, it will be understood that the winding 30 can comprise a larger number of turns 32.

Each turn 32 consists of a pair of turns since one conductor 33 is composed of two wires.

Each conductor 33 comprises a series of axial portions or lengths 34 that are received in a series of associated recesses 20.

Each conductor 33 also comprises connecting portions or lengths 36 with a roughly transverse orientation, which connect the consecutive axial portions 34 of the winding 30 and which extend alternately in projection with respect to the top axial end radial face 18 and in projection with respect to the bottom axial end radial face 16 in order to form leading-out wires.

The connecting portions 36 here have a shape roughly in the form of a V.

The recesses 20 in a series of recesses receive the axial portions 34 of the conductors 33 belonging to a phase winding 30.

Naturally, in a known manner, a recess insulator, not shown for more clarity, is interposed between the portions 34 and the edges of the recesses 20 in order in particular to avoid damaging the conductors 33 when they are mounted in the recesses 20.

Each series of recesses 20 is associated with one of the six phase windings 30. Two consecutive recesses 20 in a series of recesses 20 are separated by adjacent recesses 20 each corresponding to another series of recesses 20 associated with one of the other five phase windings 30.

Thus, for a hexaphase stator as is the case in FIG. 1, five adjacent recesses 20 are left free between two recesses 20 in each series. In other words the conductors 33 of a winding are inserted in one recess 20 out of six adjacent recesses 20.

Thus, for a stator comprising N phase windings 30, the axial portions 34 of a turn 32 are received in one recess 20 out of N adjacent recesses 20.

Here, concerning a stator with 72 recesses and six phases, the portion 34 of a turn 32 is received in the recess 1 and the following portion 34 of the same winding 30 in the recess 7 and so on.

The stator 11 is produced according to a method that will be described subsequently with reference to FIG. 4 et seq.

Figure 4:
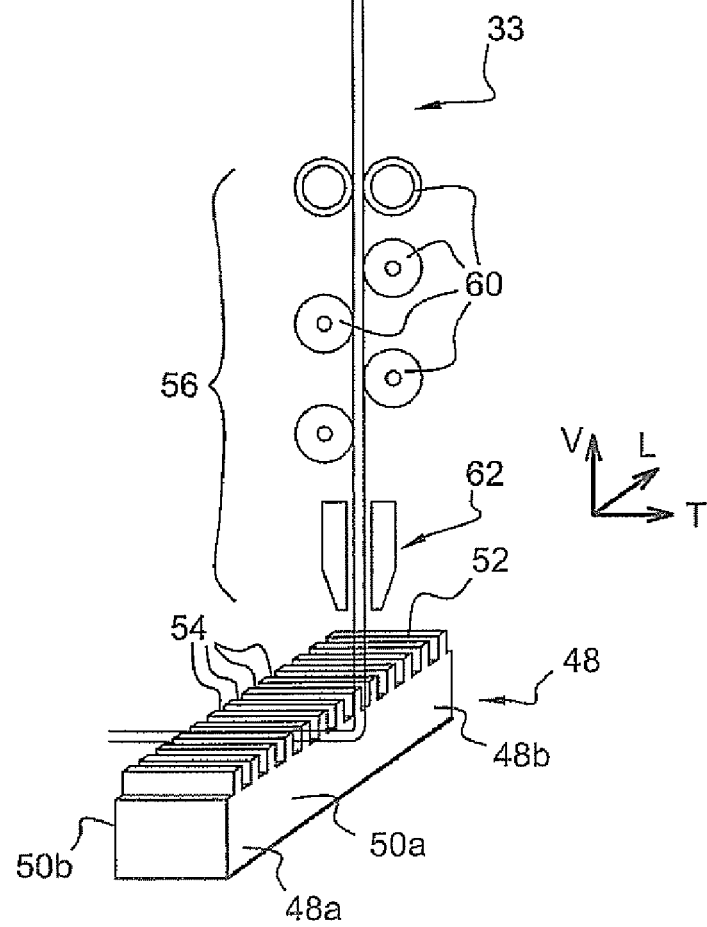
FIG. 4 is a schematic representation in perspective of an installation for implementing the first step of depositing the wires on the linear support.
Figure 14:
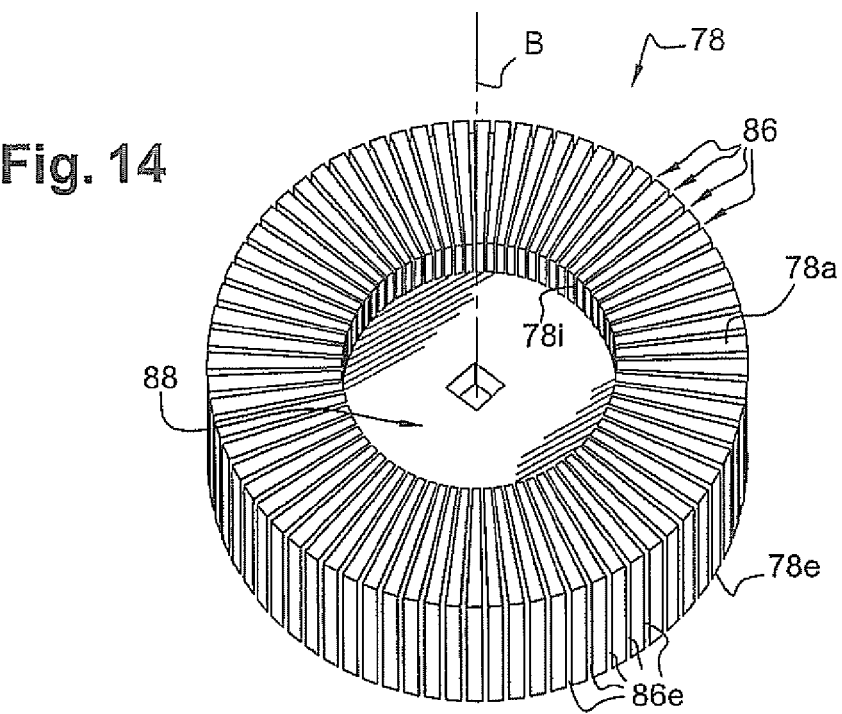
FIG. 14 is a schematic representation of the annular supported depicted in FIGS. 12 and 13.

This production method comprises successively a step of depositing conductors 33 forming the turns 32 on a linear support 48, more clearly visible in FIG. 4, in order to form the longitudinal lengths 34 and the connecting lengths 36, a first step of transferring the conductors 33 deposited on the linear support 48 to an annular support 78, more clearly visible in FIG. 14, in order to form the turns 32, and a second step of transferring the turns 32 formed on the annular support 78 to the body 10.

FIG. 4 depicts an installation for implementing a step or depositing the conductor 33 on the linear support 48.

In the description of the installation that follows, the orientations vertical, longitudinal and transverse will be adopted non-limitingly according to the reference frame V, L, T indicated in FIG. 4.

The linear support 48 consists of a roughly parallelepipedal element of longitudinal principal orientation, and is in particular delimited by two vertical longitudinal lateral faces 50a, 50b and a horizontal top face 52.

The top face 52 of the linear support 48 comprises transverse recesses 54, which open out transversely in the lateral faces 50a, 50b of the linear support 48 and which are distributed longitudinally at a constant pitch along the linear support 48. The recesses 54 have parallel edges and have a rounded bottom (FIG. 9) adapted to the shape of the wires 38a, 38b here circular cross section.

The installation comprises a deposition head 56 associated with each conductor 33 and which makes it possible to deposit the two wires 38a, 38b of a associated conductor 33 on the linear support 48. Here, for reasons of clarity, FIG. 4 depicts a single deposition head 56, in association with a single conductor 33, however, the deposition heads 56 being identical, it will be understood that the description that follows of a head 56 applies by similarity to the other deposition heads 56.

The deposition head 56 comprises a set of rollers 60 that make it possible to carry out the drawing of the conductor 33 and a wire-guide nozzle 62 through which the conductor 33 leaves the deposition head 56. This nozzle 62 is conformed so as to deposit the conductor 33 on the linear support 48 forming the axial lengths 34 and the connecting lengths 36.

Finally, the installation comprises a container 58 supplying the head 56, from which the associated conductor 33 comes, such as a coil of wire for example.

Thus, for each conductor 33, there are provided two containers 58 at the rate of one container 58 per wire 38a, 38b.

The step of depositing the conductor 33 comprises a first deposition phase during which each deposition head 56 deposits the associated conductor 33 on the linear support 48 so as to form a first layer of conductors 33, and a second deposition phase that is subsequent to the first deposition phase and during which each deposition head 56 deposits the associated conductor 33 on the linear support 48 in order to form a second layer of conductors 33 that is superimposed vertically on the first layer of conductors 33.

FIGS. 5 and 7 depict the two layers 64, 66 of conductors 33 that are obtained at the end of the step of depositing the conductors 33, the reference 64 designating the first layer and the reference 66 the second layer superimposed vertically on the first layer 64.

For reasons of clarity of the figures, the two layers 64, 66 are shown offset transversely with respect to each and in these figures only the ends 48a, 48b of the support 48 have been shown.

During each deposition phase, the deposition heads 56 move with respect to the linear support 48 on a roughly sinusoidal path, so as to deposit each conductor 33 in recesses 54 (FIGS. 4, 6, 8) in the linear support 48 that are associated with the conductor 33.

Thus, during the two deposition phases, the deposition heads 56 successively fill the recesses 54 in the linear support 48 forming transverse portions or lengths 68 (FIGS. 5 and 7) that are introduced into the recesses 54 (FIGS. 6 and 8), and lateral longitudinal portions (FIGS. 5 and 7) that are arranged transversely on each side of the linear support 48, facing each of the lateral faces 50a, 50b. The portions or lengths 70 have roughly a V shape.

Thus in each of the two layers 64, 66 each conductor 33 forms undulations, or longitudinal undulations, comprising successively a transverse portion 68 that is received in an associated recess 54, a longitudinal portion 70 that extends transversely opposite the right hand lateral face 50a of the linear support 50, a consecutive transverse portion 68, which is received in a consecutive associated recess 54, and a longitudinal portion 70, which extends opposite the left-hand lateral face 50b of the linear support 48.

Each longitudinal portion 70 that extends opposite the right-hand lateral face 50a of the linear support 48 connects the right-hand free ends of two consecutive transverse portions 68. In the same way, each longitudinal portion 70 that extends opposite the left-hand lateral face 50b of the linear support 48 connects the left-hand ends of two consecutive transverse portions 68.

In addition, the longitudinal portions 70 are arranged alternately on each side of the linear support 48, that is to say they are offset longitudinally by a pitch equivalent to the distance between two consecutive transverse portions 68.

Thus the conductor 33 is wound in a undulating manner on the support 48.

The portions 68, 70 are intended to subsequently form respectively the portions or lengths 34, 36 of the stator 11 as described below.

In a similar manner to those in the body 10 of the stator 11, the recesses 54 in the linear support 48 are associated with one conductor of a phase winding 30 per set of recesses 54.

Thus two consecutive recesses 54 in the same set of recesses 54 are separated by recesses 54, each of which belongs to one of the other sets of recesses 54.

In addition, the recesses 54 in each set of recesses 54 are distributed on the linear support 48 at a constant pitch equal to the number of phase windings 30, that is to say here with a pitch of six recesses.

The number of recesses 54 in the linear support 48 is determined according to the number of turns 32 on each phase winding 30, and according to the number of recesses in the body 10, so that each portion of each conductor 33 that forms one of the two layers of conductors 64, 66 makes it possible to form a whole number of turns 32 of the associated phase winding 30.

Here the number of recesses 54 in the linear support 48 is determined so that the portion of each layer 64, 66 of conductors 33 makes it possible to form a maximum number of four turns 32.

As stated above, each deposition phase of the deposition step consists, for each deposition head 56, of progressively depositing the conductor 33 on the linear support 48.

In accordance with the invention, the deposition step consists, for each phase winding 30, of depositing the same conductor 33 on the linear support 48 during the first deposition phase and during the second deposition phase.

Consequently each phase winding 30 is produced from a single continuous conductor 33, which comprises a first portion 33a partly forming the first bottom layer 64 and a second portion 33b partly forming the second top layer 66, and where the two portions 33a, 33b of the conductor 33 are connected together at the downstream longitudinal end of the linear support 48.

In accordance with another aspect of the invention, the first deposition phase consists of progressively introducing the transverse portions 68 of the first portion 33a of each conductor 33 from a first associated recess 54 situated at the upstream longitudinal end 48a of the linear support 48, as far as a last associated recess 54 situated at the downstream 48b of the linear support 48, that is to say from upstream to downstream, as depicted by the arrow F1.

The second deposition phase consists of progressively introducing the transverse portions 68 of the second portion 33b of each conductor 33 in the opposite direction, that is to say from downstream to upstream as depicted by the arrow F2, from an associated recess 54 situated at the downstream end 48b of the linear support 48, as far as an associated recess 54 situated at the upstream 48a of the linear support 48, when the second layer 66 of the conductors makes it possible to form the same number of turns as the first layer 64.

On the other hand, when the second layer 66 of conductors 33 is produced so that it makes it possible to form a number of turns on the winding 30 less than the number of turns formed from the first layer 64 of conductors 33, as can be seen in FIGS. 7 and 8, the second deposition phase consists of progressively introducing the transverse portions 68 of the second portion 33b of each conductor 33 from an associated recess 54 situated at the downstream end 48b of the linear support 48, as far as an intermediate recess 54.

In addition, the second deposition phase is implemented after the first deposition phase, so that the deposition step is implemented continuously, in order to form the first and then the second layer 64, 66 of conductors 33.

The deposition of each conductor 33 on the linear support 48 by the method according to the invention thus makes it possible to reduce the inactivity time of the installation between the two deposition phases.

This is because the deposition step according to the invention does not include an intermediate phase during which the deposition heads move from downstream to upstream so that the second deposition phase begins at the upstream end of the linear support 48.

In addition, since the deposition step consists of depositing a single conductor 33 in order to form each phase winding 30, each phase winding 30 then includes only two end free lengths 71 for its electrical connection.

Finally, as can be seen in FIGS. 5 and 7, the movement made by the deposition heads 56 during the deposition step begins and ends at the upstream end of the linear support 48. Consequently the two end lengths 71 of each phase winding 30 are situated close to each other.

According to another aspect of the deposition step according to the invention, the conductors 33 are deposited on the linear support 48 so that each phase winding 30 obtained at the end of the method according to the invention is of the distributed undulating type.

A phase winding 30 that is of the distributed undulating type is characterized by the fact that, between two consecutive associated recesses 20 in the body 10, at least one first turn 32 of the phase winding 30 comprises a transverse branch 36 connecting the top ends of the axial portions 34 of the turn 32, which are received in the associated consecutive recesses 20, and at least one second turn 32 of the phase winding 30 comprises a transverse branch 36 connecting the bottom ends of the axial portions 34 of the second turn 32, which are also received in these associated consecutive recesses 20.

In order to form such a phase winding 30 of the distributed undulating type, and as can be seen in FIGS. 5 and 7, each deposition phase consists of forming the two layers of conductors 64, 66 so that, at two consecutive recesses 54 in the linear support 48, which are associated with a conductor 33, each of these two recesses 54 receives a transverse portion 68 of each portion 33a, 33b of the conductor 33.

In addition, the two transverse portions 68 of the first portion 33a of the conductor 33, which are received in the two recesses 54, are connected together by a longitudinal portion 70 that is arranged at one side of the linear support 48, and the two transverse portions 68 of the second portion 33b of the conductor 33, which are received in the two recesses 54, are connected together by a longitudinal portion 70 that is arranged on the other side of the linear support 48.

As stated above the installation for depositing the conductors 33 on the linear support 48 comprises one deposition head 56 for each conductor 33.

According to yet another aspect of the method according to the invention, the deposition step consists of depositing all the conductors 33 on the linear support 48 simultaneously.

Thus, during the deposition step, all the deposition heads 56 perform the same movement simultaneously.

Consequently the first portions 33a of the conductors 33, which form the first layer 64 of conductors 33, are all parallel to one another, and the second portions 33b of the conductors 33, which form the second layer 66 of conductors 33, are all parallel to one another.

The first portions 33a of the conductors 33 thus form a first cluster or layer of conductors 33, and the second portions 33b of the conductors 33 form a second cluster or layer of conductors 33.

Figure 11:
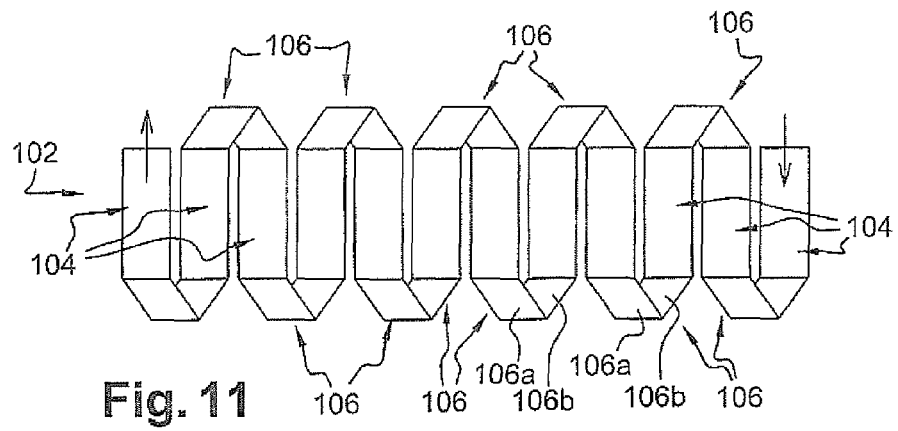
FIG. 11 is a schematic representation of a layer of conductors depicted in FIGS. 5 and 7, showing the direction of folding of the conductors.

FIG. 11 depicts schematically such a strip or layer 102 of conductors 33, which is in the form of a sinusoidal band comprising a succession of transverse portions 104 each comprising a transverse portion 68 (FIGS. 5 and 7) of each conductor 33, and two lateral portions 106 each comprising a longitudinal portion 70 (FIGS. 5 and 7) of each conductor 33.

Here the strip 102 that is depicted in FIG. 11 is the strip 102 forming the second layer 66 of conductors 33.

The movement of the deposition heads 56 with respect to the linear support 48, during each of the deposition phases, is determined so that the portions 68, 70 of the conductors 33, which form each portion 104, 106 of the strip 102, are deposited simultaneously on the linear support.

In addition, the movement of the deposition head 56 with respect to the linear support 48 is determined so that, at the end of the deposition step, the lateral portions 106 of each strip 102 are all folded in the same direction, that is to say a downstream portion 106a of each lateral portion 106 is folded over an upstream portion 106b of the lateral portion 106.

Consequently, as can be seen in FIGS. 5 and 7, the longitudinal portions 70 of the conductors 33, which form each lateral portion 106 of the strip 102, are also folded in the same direction.

In addition, in the first layer 64 of conductors 33, the downstream portion 70b of each longitudinal portion 70 is arranged vertically above the upstream portions 70a of the other longitudinal portions 70, which are situated downstream of the longitudinal portion 70 in question.

On the other hand, in the second layer 66 of conductors 33, the upstream portion 70a of each longitudinal portion 70 is arranged vertically above the downstream portions 70b of the other longitudinal portions 70 which are situation upstream of the longitudinal portion 70 in question.

In accordance with yet another aspect of the invention, during each of the two deposition phases, each deposition head 56 simultaneously deposits two wires 38a, 38b on the linear support 48, so that each conductor 33 is formed by the two wires 38a, 38b deposited by the associated deposition head 56.

During each of the two phases of deposition of the conductors 33, the movement of the deposition heads 56 with respect to the linear support 48 is determined so that the two wires 38a, 38b of each conductor 33 are offset transversely with respect to each other in each layer 64, 66 of the conductor 33.

Thus, as can be seen in FIGS. 9 and 10, a first wire 38a of the conductor 33 is arranged transversely to the left of the second wire 38a of the same conductor 33, and this alternately.

According to another aspect of the linear support 48, and as can be seen in more detail in FIG. 10, the width of each recess 54, measured in the longitudinal direction, is roughly equal to the thickness of each of the two wires 38a and 38b.

Consequently, in each recess 54 in the linear support 48, the lengths 72a, 72b of the wires 38a, 38b that are received in this notch are superimposed vertically one on the other.

According to yet another aspect of the invention, the lengths 72a, 72b of the wires 38a, 38b are arranged alternately one above the other in the associated recesses 54 in the linear support 48, that is to say, in a first associated recess 54, the length 72a of the first wire 38a that is received in this recess 54, is arranged vertically above the length 72b of the second wire 38b that is received in this same recess 54.

In addition, in a second associated recess 54, which follows on from the first associated recess 54, the length 72a of the first wire 38a that is received in this second associated recess 54 is arranged vertically below the length 72b of the second wire 38b that is received in this second associated recess 54.

Thus, when each layer 64, 66 of the conductor 33 is looked at laterally, the longitudinal lengths 74a, 74b that connect the transverse lengths 72a, 72b that are received in two adjacent recesses 54, intersect.

However, as stated above, the two wires 38a, 38b are offset transversely with respect to each other in each layer 64, 66.

Consequently, the two longitudinal lengths 74a, 74b are not superimposed vertically.

Because the two wires 38a, 38b of each conductor 33 are offset transversely with respect to each other, the length of the longitudinal lengths 74a, 74b of the wires 38a, 38b connecting the transverse lengths 72a, 72b that are received in two consecutive associated recesses 54, are of different lengths.

For example here, as can be seen in FIG. 9, the first wire 38a is arranged transversely to the left of the second wire 38b.

As a result the length of the longitudinal length 74a of the first wire 38a which is arranged opposite the right-hand lateral face 50a of the linear support 48 and which connects two transverse lengths 72a received in two consecutive associated recesses 54, is shorter than the length of the longitudinal length 74b of the second wire, which is also arranged opposite the right-hand lateral face 50a of the linear support 48 and which connects the two transverse lengths 72b of the second wire 38b received in these same two associated consecutive recesses 54.

On the other hand, the length of the longitudinal length 74a, which is arranged opposite the left-hand lateral face 50b of the linear support 48 and which connects two transverse lengths 72a of the first wire 38a received in two consecutive associated recesses, is of greater length than the longitudinal length 74b of the second wire 38b, which connects the transverse lengths 72b of the second wire 38b received in these two recesses.

As is clear from the above, the first deposition phase and the second deposition phase each consists, for each conductor 33, of successively filling the recesses 54 of the linear support 48 that are associated with the conductor 33, introducing a roughly rectilinear transverse length 68 of the conductor (33) into an associated recess 54, bending and/or curving the conductor 33 in order to form a longitudinal length 70 that is situated transversely opposite a lateral vertical longitudinal face 50a, 50b of the linear support, and introducing a consecutive transverse length 68 into a consecutive associated recess 54, so that the conductor 33 forms longitudinal undulations comprising a succession of transverse lengths 38 that are received in the associated recesses 54 and longitudinal lengths 70 that are arranged alternately on each side of the linear support 48.

As stated above, the method of producing the stator according to the invention comprises a first step of transferring the conductors 33 that have been deposited on the linear support 48 during the deposition step, to an annular support, so as to form the turns 32 of the phase windings 30.

FIGS. 12 to 15 depict an installation for implementing the first transfer step, which comprises the annular support 78, a casing 80 for guiding the annular support 78 in movement with respect to the linear support 48, two longitudinal guides 82 and a bottom base 84.

In this embodiment the guides 82 are fixed to the base 84.

As can be seen in more detail in FIG. 14, the annular support 78 is an element of revolution of transverse principal axis B, which is delimited radially at its external periphery by an external cylindrical face 78e and at its internal periphery by an internal cylindrical face 78i. This support 78 is delimited axially by two axial end radial faces 78a and comprises axial recesses 86 produced in the external cylindrical face 78e of the annular support 78 and opening out axially in the radial axial end faces 78a of the annular support 78.

The outside diameter of the support 78 is roughly equal to the inside diameter of the body 10 so that the support 78 can enter inside the body 10, a small air gap then existing between the external periphery of the support 78 and the internal periphery of the body 10.

The distance between the external radial ends 86e of two adjacent recesses 86 in the annular support 78 is equal to the distance between two adjacent recesses 54 in the linear support 48.

The number of recesses 86 in the annular support 78 is equal to the number of recesses 20 in the body 10 of the stator 11, that is to say here the annular support 78 comprises seventy two recesses 86.

Finally, the annular support 78 comprises a central hub 88 that is fixed to the internal cylindrical face 78*i* of the annular support 78 and that allows the rotational driving of the annular support 78 about its principal axis B during the first transfer step.

The axial length of the central hub 88, measured with respect to the principal axis B of the annular support 78, is less than the distance between the two radial axial end faces 78*a* of the annular support 78.

In addition, the central hub 88 is arranged axially along the axis B of the annular support 78 roughly at the middle of the annular support 78, recessed with respect to each of the two radial faces 78*a* of the annular support 78.

Consequently each recess 86 of the annular support 78 opens out radially in the internal cylindrical face 78*i* of the annular support 78, on each side of the central hub 88.

Thus the support 78 comprises one central hub 88 and two rings (not referenced) rotationally integral with the hub 88 and extending on each side of the hub. These rings comprise the recesses 86 with parallel edges.

The casing 80 comprises a bore 90 coaxial with the annular support 78 and in which the hub 88 of the annular support 78 is received so as to be free to rotate about its principal axis B. The rings of the support 78 extend on each side of the casing 80. The hub 88 has centrally a hole (not referenced), not circular in shape, here rectangular in shape, for its rotational connection by cooperation of shapes with the end of a shaft (not shown) intended to be driven in rotation, for example by a crank or a motor, for example an electric motor.

The casing 80 comprises a bottom horizontal face 80*i* that is able to come into abutment on the horizontal top face 84*s* of the linear support 48.

The bore 90 in the casing 80 emerges vertically downwards in the bottom face 80*i* of the casing 80, to allow the transfer of conductors 33 to the annular support 78.

When the first transfer step is implemented, the linear support 48 is received transversely between the lateral guides 82 and is received vertically between the bottom face 80*i* of the casing 80 and a horizontal top face 84*s* of the bottom base 84.

Thus the linear support 48 is guided longitudinally without clearance during the first transfer step.

Each lateral guide 82 also comprises a top face 92 in the form of a ramp, the inclination of which is determined so that each top face 92 is able to bear below the longitudinal lengths 74*a*, 74*b* of the wires 38*a*, 38*b*, so as to progressively drive the wires 38*a*, 38*b* upwards, for transfer thereof towards the annular support 78.

Figure 13:
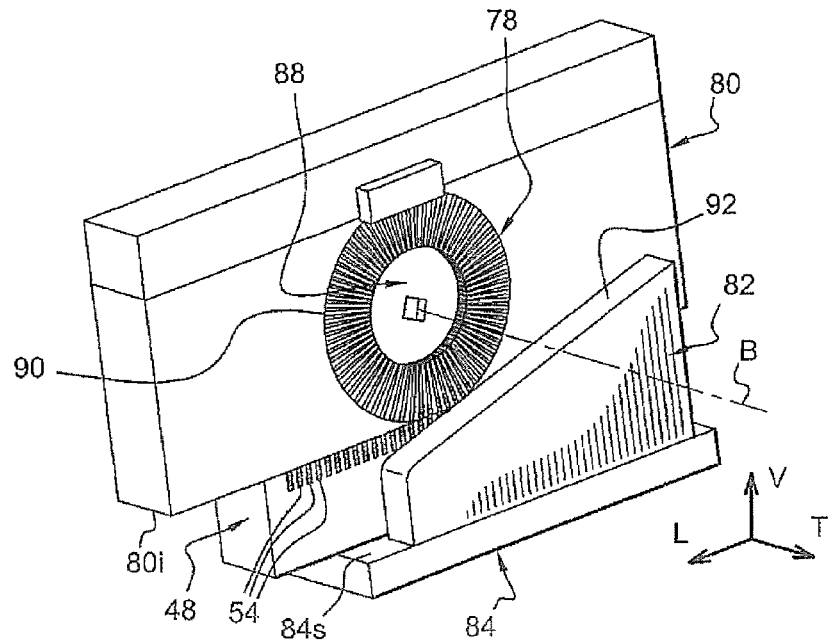
FIG. 13 is a perspective view to a larger scale of the installation depicted in FIG. 12.
Figure 15:
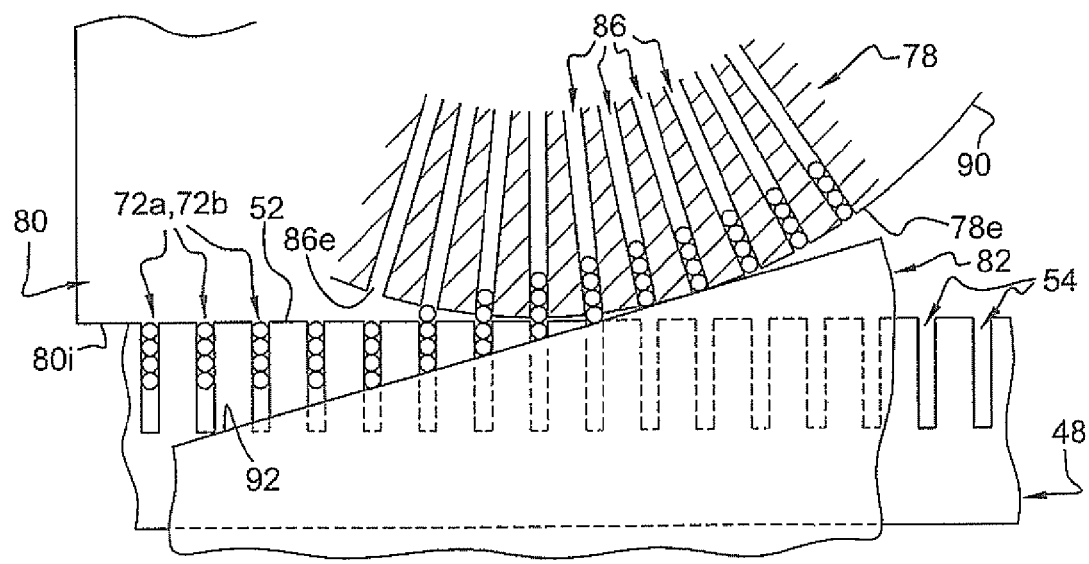
FIG. 15 is a detail to a larger scale of the installation depicted in FIG. 12; showing the transfer of the conductive wires by means of the lateral guides.

According to the embodiment depicted in FIGS. 13 and 15, the top face 92 of each lateral guide 82 is flat and inclined with respect to a horizontal plane.

However, it will be understood that the invention is not limited to this embodiment, and that the shape of the top face 92 of each guide may be different, for example the top face 92 may be convex and curved upwards, concave and open upwards, or may form two planes inclined at different angles.

Finally, each lateral guide 82 can also be produced in several parts, and/or it may be able to move vertically so as to push the longitudinal lengths 74*a*, 74*b* of the wires 38*a*, 38*b* upwards.

The first transfer step consists of rotationally driving the hub 88, for example in the aforementioned manner by means of a crank or motor, and to make the annular support 78 run on the top face 52 of the linear support 48 so that the recesses 86 in the annular support 78 successively come opposite the recesses 54 in the linear support 48 and without sliding of the annular support 78 with respect to the linear support 48.

For this purpose, when the first transfer step is implemented, the external cylindrical face 78*e* of the annular support 78 is in abutment vertically downwards against the top face 52 of the linear support 48 with the presence of a slight clearance (FIG. 15).

When the annular support 78 travels, as can be seen in FIG. 15, on the linear support 48, the casing 80, the lateral guides 82 and the bottom base 84 translate longitudinally with respect to the linear support 48, following the longitudinal movement of the annular support 78 with respect to the linear support 48.

During the first transfer phase, the top face 92 of each lateral guide 82 bears upwards against the longitudinal lengths 70 of the conductors 33 that are situated at the bottom of each recess 54 in the linear support 48.

Thus the transverse lengths 68, which are received in one and the same recess 54 in the linear support 48, are simultaneously transferred from the associated recess 54 in the linear support 48 to a recess 86 in the annular support 78 so that the first layer 64 and the second layer 66 of conductors 33 are simultaneously transferred from the linear support 48 to the annular support 78.

As stated above, the annular support 78 comprises a number of recesses 86 that is equal to the number of recesses 20 in the body 10 of the stator 11 and the linear support 48 comprises a number of recesses 54 that is greater than the number of recesses 20 in the body 10.

Consequently, during the first transfer step, the annular support 78 makes several rotations about its principal axis B while it is running on the top face 52 of the linear support 48, and the two layers 64, 66 of conductors 33 wind around the annular support 78, forming two coaxial spirals, each spiral of one of the two spirals corresponding to one rotation of the annular support 78 about its axis B.

According to a first embodiment depicted in FIGS. 5 and 6, each layer 64, 66 of conductors 33 is produced so that it makes it possible to form the same number of turns 32 for each phase winding 30, here four turns 32 for each layer 64, 66, each turn 32 corresponding to one rotation of the body 10 for the same winding 30.

Thus, as depicted schematically in FIG. 6, each layer 64, 66 consists of a longitudinal succession of four parts 64*a*, 66*a* making it possible each to form a turn 32, and each part 64*a*, 66*a* is formed by the transverse 68 and longitudinal 70 portions of the conductors 33, which are associated with a number of recesses 54 in the linear support 48 equal to the number of recesses 20 in the body 10, that is to say here seventy two recesses 54.

According to the embodiment depicted in FIGS. 7 and 8, each layer 64, 66 of conductors 33 is produced so that it makes it possible to form a different number of turns 32 for each phase winding 30, here the first layer 64 makes it possible to form four turns 32 and the second layer 66 makes it possible to form three turns 32.

Consequently, in a similar manner to the embodiment described above, with reference to FIGS. 5 and 6, the first layer 64 consists of a longitudinal succession of four parts 64*a*. On the other hand the second layer 66 consists of a longitudinal succession of only three parts 66*a*.

For each rotation made by the annular support 78, each recess 86 in the annular support 78 receives the transverse portion or portions 68 that are arranged in an associated recess 54 in the linear support 48. Thus, as the first transfer step is performed, the transverse portions 68 are superimposed radially in each recess 86 in the annular support 78.

Consequently, at the end of the first transfer step, each recess 86 in the annular support 78 receives a number of transverse portions 68 equal to the number of turns 32 formed, that is to say eight transverse portions 68 according to the embodiment depicted in FIGS. 5 and 6, or seven transverse portions according to the embodiment depicted in FIGS. 7 and 8.

In general terms the length of the support 48 is determined by the number N10 of recesses 54 necessary.

This number of recesses 54 depends on the number N1 of recesses 20 in the body 10 of the stator 11, the number p of pairs of poles, the number of rotations Nt of the winding to be carried out and the number q of arrivals of two wires.

This gives the following equations:

$N1 = 2 \times p \times q$ $N10 = Nt \times q \times p + q$ if $Nt$ is odd $N10 = (Nt+1) \times q \times p + q$ if $Nt$ is odd.

Each recess 20 in the stator 11 contains Nf elementary wires. Then Nf=2Nt.

In the example embodiments in FIGS. 5 to 8, the stator 11 is intended to be associated with a claw rotor comprising twelve poles.

In these figures q is equal to 6 and p is equal to 6.

For 7 rotations (FIGS. 7 and 8) or 8 rotations (FIGS. 5 and 6), then N1=72, N10=294 and Nf=14 or 16 wires per recess 20.

The movement of the support 48 is controlled for position and speed along the three axes V, L, T.

By virtue of these provisions a high filling rate of the recesses 20 is subsequently obtained.

Figure 12:
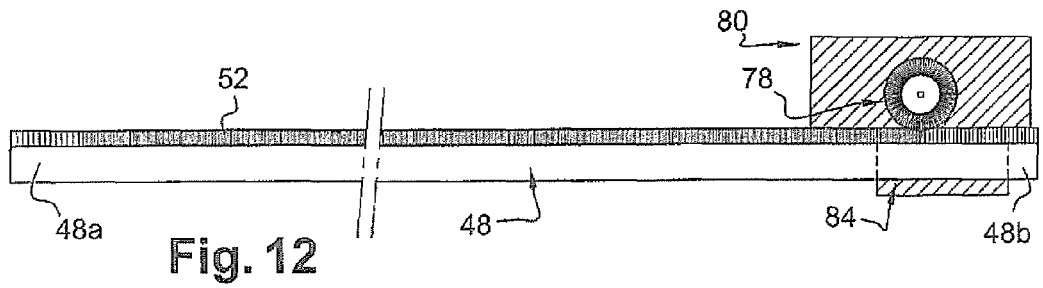
FIG. 12 is a schematic representation of an installation for implementing the first transfer step.

In accordance with another aspect of the invention and as can be seen in FIG. 12, the first transfer step consists of making the annular support 78 run on the top face 52 of the linear support 48 from downstream to upstream, so as to progressively transfer the transverse portion 68 of the conductors 33 to the annular support 78 from the transverse portions 68, which are received in the recess 54 in the linear support 48, which is situated at the downstream longitudinal end 48b of the linear support 48, as far as the transverse portions 68 that are received in the recess 54 in the linear support 48, which is situated at the upstream longitudinal end 48a of the linear support 48.

Thus the end lengths 71 of each conductor 33 are arranged at the level of the radially external turns of the spirals thus formed.

In addition, during the first transfer step, the layers 64, 66 of conductors 33 are wound on one another so that each turn 32 formed from a part 64a, 66a of a layer 64, 66 of conductors is situated radially between two turns 32 formed from two portions of the other layer 66, 64 of conductors.

As described previously, and according to another aspect of the invention depicted in FIGS. 9 and 10, each conductor 33 comprises two wires 38a, 38b.

Consequently the first transfer step consists of transferring the two wires 38a, 38b of each conductor as described previously.

During the first transfer step, the transverse lengths 72a, 72b of the two wires 38a, 38b that are received in each recess 54 in the linear support 48 are all transferred into the same associated recess 86 facing the annular support 78.

In addition, since the annular support 78 makes several rotations about its axis B during the first transfer step, each of the recesses 86 receives successively the transverse lengths 72a, 72b that were received in several recesses 54 in the linear support 48 associated with the same conductor 33.

Figure 16:
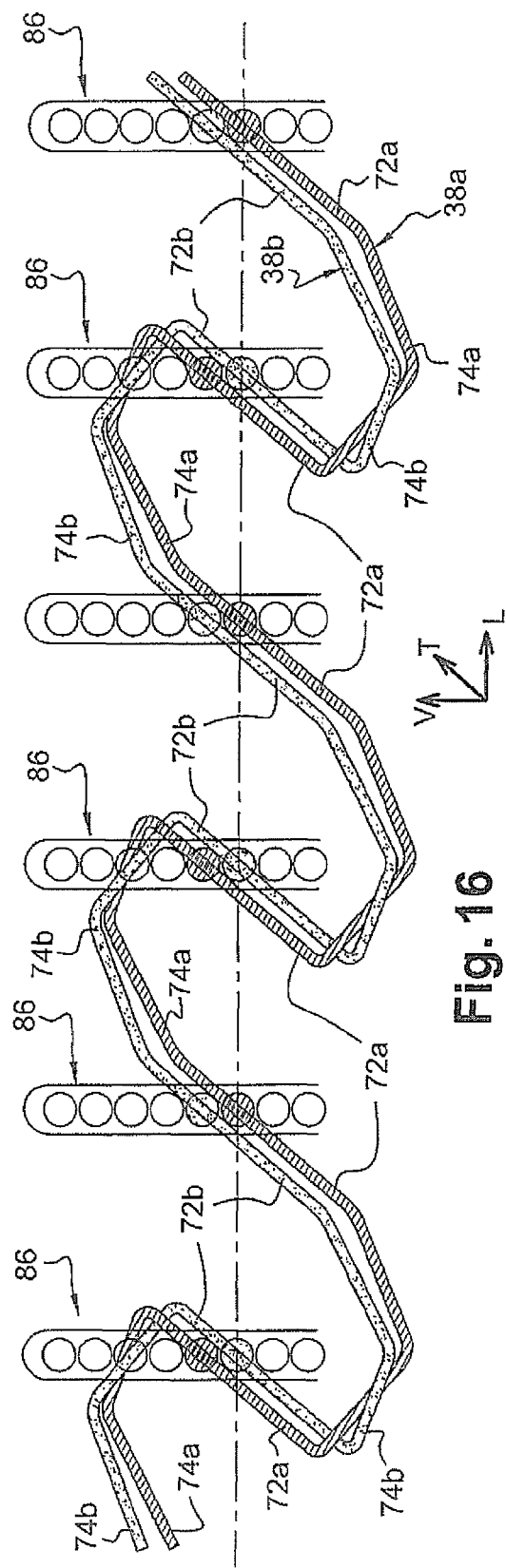
FIG. 16 is a schematic representation in perspective of two conductive wires that have been transferred onto the annular support at the end of the first transfer step, showing the relative positions of the portions of the two wires with respect to each other.

Thus, as can be seen for example in FIG. 16, when the annular support 78 makes two rotations about its axis B during the first transfer step, each recess 86 receives eight transverse lengths 72a, 72b.

In addition, the width of each recess 86 in the annular support 78 is here roughly equal to the width of each of the two wires 38a, 38b.

Consequently the transverse lengths 72a, 72b of the wires 38a, 38b are superimposed radially in the recesses 86 in the annular support 78 and in the same configuration as in the recesses 54 in the linear support 48.

Thus the transverse lengths 72a, 72b belonging to the same turn 32 are superimposed radially in each recess 86 in the annular support 78 alternately, and the longitudinal lengths 74a, 74b of the two wires 38a, 38b that connect the transverse lengths 72a, 72b that are received in two associated consecutive recesses 86 belonging to the same turn 32.

Figure 17:
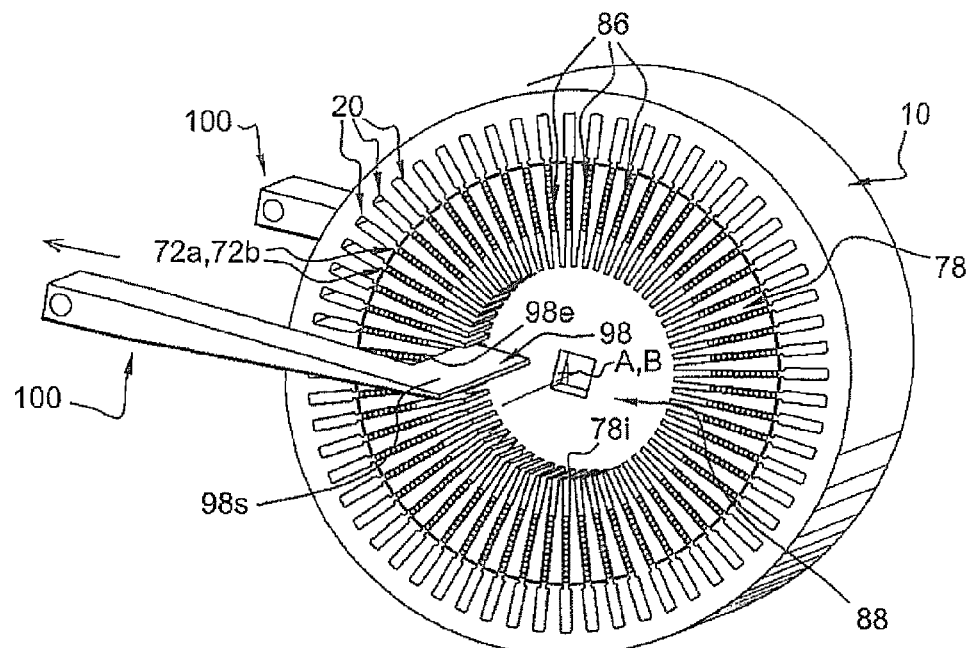
FIG. 17 is a schematic representation in perspective of the installation for implementing the second transfer step, in which the extraction blades are shown in the initial position.
Figure 18:
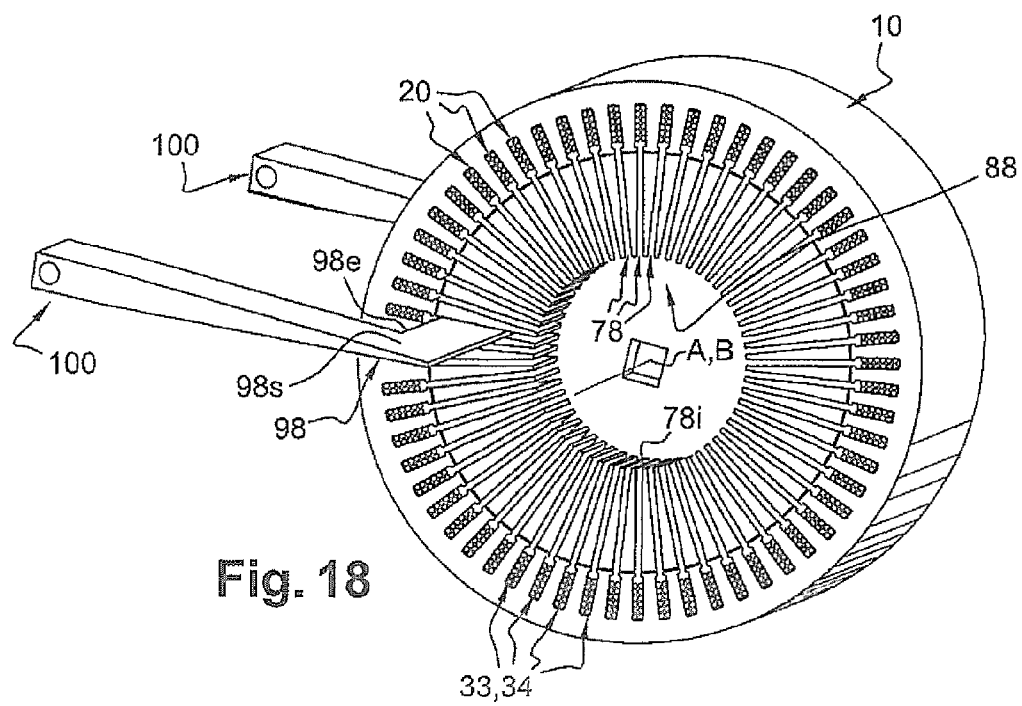
FIG. 18 is a view similar to that in FIG. 17, in which the extraction blades are depicted in the final position for which the coil has been transferred onto the body.

FIGS. 17 and 18 depict an installation for implementing the second step of transferring conductors 33 from the annular support 78 to the body 10 of the stator 11.

This installation comprises means of positioning the annular support 78 in the body 10, so that the annular support 78 is received coaxially with the body 10, in the circular housing delimited by the internal cylindrical face 12 of the body. Finally, the diameter of the external cylindrical face 78e of the annular support 78 is roughly equal to the diameter of the internal cylindrical face 12 of the body 10.

The installation also comprises means of locating the annular support 78 about its principal axis B, so that each recess 86 in the annular support 78 is opposite a recess 20 in the body 10 and opens out radially in the axial groove 26 of the associated recess 20.

Finally, the installation comprises radial insertion blades 98, each of which extends in a radial plane with respect to the principal axis B of the annular support 78 and of the body 10.

The installation comprises a pair of insertion blades 98 that is associated with each recess 86 in the annular support 78, and the insertion blades 98 in the same pair are distributed axially on each side of the central hub 88 of the annular support 78.

Here the annular support 78 comprises seventy two recesses 86, and the installation consequently comprises seventy two pairs of insertion blades 98, that is to say a total of one hundred and forty four insertion blades 98.

For reasons of clarity, FIGS. 17 and 18 depict only one pair of insertion blades 98.

The pairs of blades 98 being identical and distributed angularly about the principal axis B of the annular support 78, the description of the blades 98 that follows applies identically to the other insertion blades 98.

The two insertion blades 98 in one and the same pair are associated with a single recess 86 in the annular support 78.

They extend in the radial mid-plane of the associated recess 86, and the thickness of each blade 98 is less than the smallest width of the associated recess 86.

As stated above, the two blades 98 in one and the same pair are arranged axially on each side of the central hub 88 of the annular support 78.

More precisely, as can be seen in FIG. 17, at the start of the second transfer step, each blade 98 is situated radially so that the external radial end edge 98e of each blade 98 is situated radially at the internal cylindrical face 78i of the annular support 78.

The external axial end 98s of each blade 98, that is to say the one that is situated axially at a distance from the central hub 88, projects axially with respect to the associated radial face 78a of the annular support 78 and carries a rod 100 for driving the blade 98, which extends radially towards the outside with respect to principal axis B of the annular support 78.

When the second transfer step is implemented, the insertion blades 98 of one and the same pair are driven radially with respect to the principal axis B of the annular support 78, so that each blade 98 moves radially in the associated recess 86 in the annular support towards the outside of the annular support 78, simultaneously driving the transverse portions 68 of the conductor 33, which are received in this recess 86, so that these transverse portions 68 migrate in the associated recess 20 in the body 10, then forming the axial lengths 34 of the phase windings 30.

According to a preferred embodiment of the second transfer step, the insertion blades 98 are all driven simultaneously in their radial movement with respect to the principal axis B of the annular support 78, which makes it possible to have a limited duration of this second transfer step.

At the end of the driving phase, and as can be seen in more detail in FIG. 18, each blade 98 is situated radially with respect to the principal axis B of the annular support 78 so that its external radial end edge 98e is situated roughly at the external cylindrical face 78e of the annular support 78.

At the end of the second transfer step, the transverse portions 68, which were received in the recesses 86 in the annular support 78, form the axial lengths 34 of the conductors 33, and the longitudinal portions 70 form the connecting lengths 36 of the conductors 33.

The first transfer step is implemented by running the annular support 78 on the linear support 48, each longitudinal portion 70 is then deformed by curving during this first transfer step, so that the connecting length 36 formed from each longitudinal portion 70 extends roughly over an arc of a circle that is centered on the principal axis A of the body 10 of the stator 11 and that is delimited angularly by the recesses 20 in the body 10 which receive the axial lengths 34 connected together by this connecting length 36.

In addition, since each recess 20 in the body 10 of the stator 11 extends radially with respect to the principal axis A of the body 10, the length of an arc of a circle delimited by two recesses 20 in the body 10 is proportional to the radius of the arc of a circle.

According to a first embodiment of the invention, all the connecting lengths 36 have identical lengths greater than the length of the arc of a circle over which each connecting length 36 extends. Consequently two connecting lengths 36 forming part of two radially offset turns 32 have different axial heights, the axial height of the connecting length 36 forming part of the radially internal turn 32 being greater than the axial height of the connecting length 36 forming part of the radially external turn 32.

Figure 19:
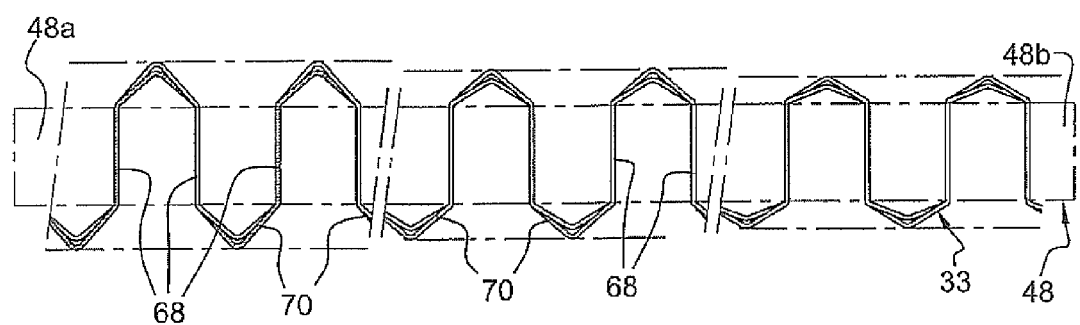
FIG. 19 is a schematic representation of two conductors forming the same winding that are in position mounted on the linear support, showing the difference in length of the longitudinal portions forming the different turns.

In accordance with yet another aspect of the invention and as depicted schematically in FIG. 19, so that all the connecting lengths of the stator 11 have the same axial height, the movement of the deposition heads 56 during the deposition phases is determined so that the length of the longitudinal portions 70 that are situated close to the downstream end 48b of the linear support 48 is less than the longitudinal lengths that are situated at the upstream end 48a of the linear support 48.

According to a preferred embodiment of this aspect of the invention, the movement of the deposition heads 46 during the deposition phases is determined so that the longitudinal portions 70 which, at the end of the second transfer step, form connecting lengths 38 situated at the same radial dimension with respect to the axis A of the body 10, have the same length.

Finally, according to another aspect of the invention according to which each conductor 33 comprises two wires 38a, 38b, all the transverse lengths 72a, 72b that are received in each recess 86 in the annular support 78 are transferred into an associated recess in the body 10.

According to a preferred embodiment of the stator depicted in FIG. 1, the width of each recess 20 in the body 10 is roughly equal to twice the width of each wire 38a, 38b.

Naturally the width of the grooves 26 of the recesses 20 level with the face 12 of the body 10 is equal to the dimension of the wires 38a, 38b to within mounting clearance, so that the wires 38a, 38b can enter the recesses, as can be seen in FIGS. 17 and 18.

Thus, at the end of the second transfer step, and for each turn 32 of a phase winding 30, the two wires 38a, 38b are arranged roughly at the same radial dimension with respect to each other.

When they are transferred from a recess 86 in the annular support 78, in which they are aligned radially, to the associated recess 20 in the body 10 of the stator 11, in which they are arranged at the same radial dimension, the lengths 72a, 72b are distributed tangentially with respect to the principal axis A of the body 10 because of the inherent elasticity of the wires 38a, 38b.

This is because, as stated above, the transverse lengths 72a, 72b of the wires 38a, 38b that form one and the same longitudinal portion 70 have different lengths, and thus the two transverse lengths 72a, 72b of a wire 38a, 38b that are received in two recesses 86 of the annular support 78 and that are connected together by a longitudinal length 74a, 74b with the shortest length naturally have a tendency to move closer to each other in the associated recesses 20 in the body 10, compared with the two transverse lengths 72a, 72b that are received in the same two recesses 86 in the annular support 78 and that are connected by a longitudinal length with the greatest length, which then naturally has a tendency to separate from each other.

Figure 3:
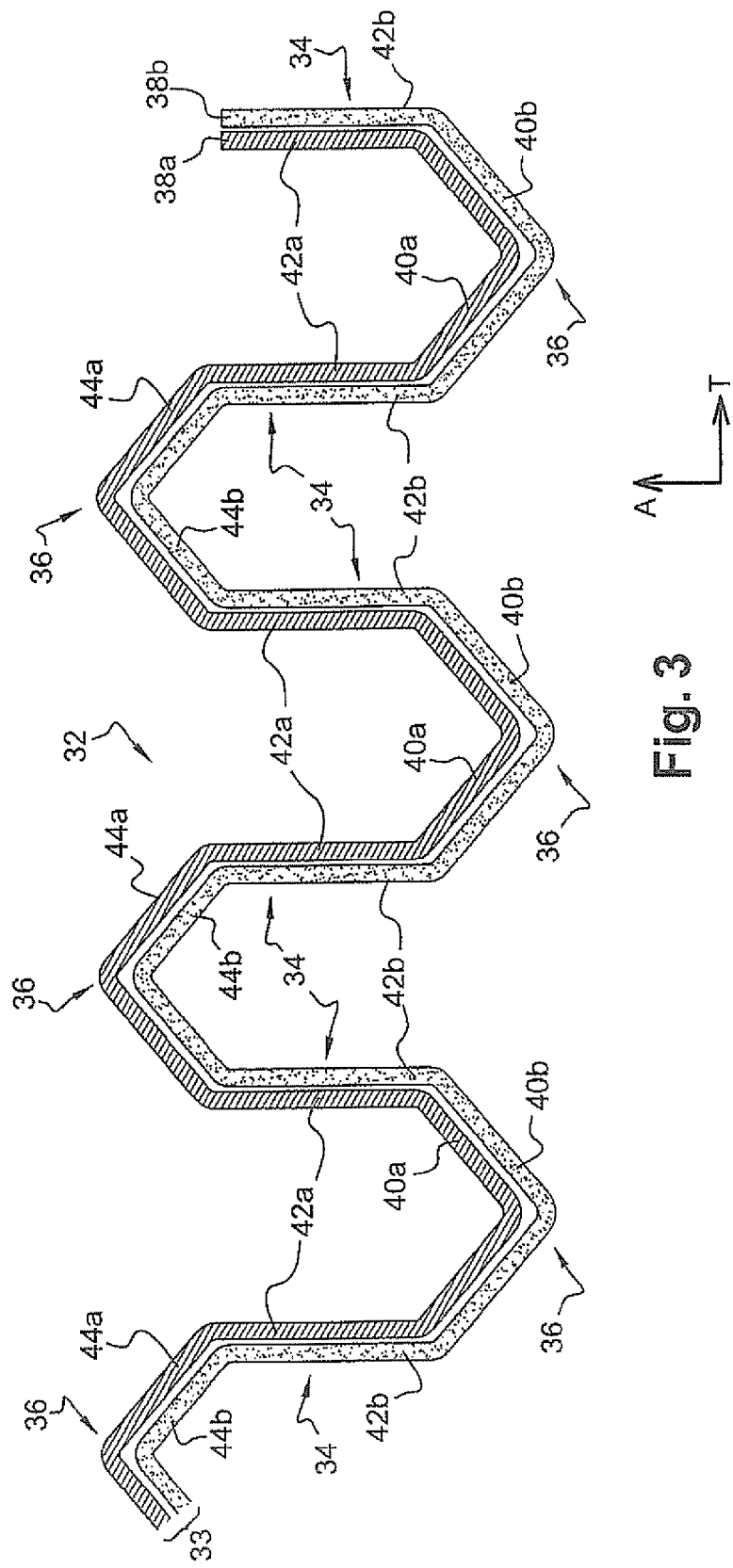
FIG. 3 is a linear development of two conductive wires forming a winding, showing the axial position of the two wires with respect to each other.

As can be seen in FIG. 3, a first wire 38a is arranged axially above the second wire 38b.

Consequently, the bottom length 40a of the first wire 38a is arranged axially above the bottom length 40b of the second wire 38b, and the top length 44a of the first wire 38a is arranged axially above the top length 44b of the second wire 38b.

In addition, the axial lengths 42a, 42b are distributed in the recesses so that two axial lengths 42a of the first wire 38a that are received in two consecutive associated recesses 20 of the same winding and that are connected together by the top length 44a of the first wire 38a are arranged on each side of the axial lengths 42b of the second wire 38b that are received in the same two consecutive associated recesses 20 and are connected together by the top length 44b of the second wire 38b.

Thus two axial lengths 42a of the first wire 38a that are received in two consecutive associated recesses 20 that are connected together by the bottom length 40a of the first wire 38a are arranged between the axial lengths 42b of the second wire 38b that are received in the same two consecutive associated recesses and that are connected together by the bottom length of the second wire 38b.

As is clear from the description and drawings the width of the recesses 54 in the support 48 is equal to the diameter of the insulated wires 38a, 38b of the conductor 33 increased by a mounting clearance.

The linear pitch of the recesses 54 corresponds roughly to the circumferential pitch of the recesses 20 in the body 10.

The depth of the recesses 54 is calculated so as to receive two pairs of radially aligned wires 38a, 38b, as can be seen in FIG. 10, increased by a clearance. This clearance is advantageously greater than a mounting clearance. The clearance here is greater than 1 mm.

The width of the support 48, that is to say the distance between these faces 50a, 50b, corresponds to the distance between the faces 16, 18 of the body 10 increased by a clearance. This clearance is advantageously greater than 0.5 mm and less than the aforementioned clearance concerning the depth of the recesses 54.

The same applies with regard to the annular support 78. Thus the width of the support 78 between its radial faces 78a is equal to the width of the support 48, that is to say the width of the body 10 between its faces 16, 18, increased by a clearance.

The width of the recesses 86, here with parallel edges, is equal to the width of the recesses 54.

The depth of the recesses 86 is calculated so as to receive several pairs of radially aligned wires 38a, 38b increased by a clearance, which may be close to zero. Here eight wires per recess are provided in the aforementioned manner.

The support 48, single-piece in FIG. 4, is in a variant in two parts, the recesses 54 being split centrally. Thus the longitudinal slots make it possible to pass a tool assisting the extraction of the wires 38a, 38b.

This extraction-aid tool can then be a third guide with a ramp, of the same type as the guides 82, disposed between the two guides 82.

Naturally the present invention is not limited to the example embodiments described. Thus the wires 38a, 38b with a circular cross-section in the drawings may have another cross-section, for example a cross-section in the form of a flat or a hexagonal cross-section.

It will be appreciated that a good filling rate of the recesses 20 is obtained with good arrangement of the wires and that the two wires 38a, 38b of the conductor 33 are roughly parallel over the entire length of the winding. The turns in the different pairs of wire follow each other radially.

A good passage of air is obtained at the portions 36 situated at each side of the body 10.

This allows good cooling of the body 10 of the stator in particular when the latter belongs to an alternator or to a compact alternator/starter with internal ventilation comprising at least one fan integral with the rotor and a perforated casing as described in the aforementioned document WO-A01/69762.

In the light of FIGS. 5 to 8 it will be appreciated that the entries and exits of the windings are close.

In these figures it is at the end 48b that the reversal of the direction of coiling of the windings takes place, while the entries and exits, consisting of the lengths 71, of the windings are closer to the end 48a; six additional recesses 54 being provided below the entries for the exits 72 in the embodiment in FIG. 5.

Thus, in the case of an undulating coil with eight turns (eight parts 64a, 64b), the first portion 33a is deposited in the recesses 1 to 288 and the second portion 33b in the opposite direction in the recesses 282 to 294.

In the embodiment in FIG. 7, the same procedure is followed for the first six parts 64a, 66a as in the embodiment in FIG. 5. The last part 66b in this case consists of the grooves 72 to 67.

In both cases at the end of the last part 66a of the first layer 64 the start of the second layer 66 is coiled in the recesses 282 to 277.

The last parts 66b are therefore occupied by the two conductors 33 with two wires 38a, 338b.

As is known the windings 30 are coupled in a star and/or delta in an alternator or alternator/starter of the type described in the document WO-A-01/69762.

The rollers 60 can be mounted in the aforementioned manner instead of a coil with conductive segments. It is therefore possible to equip the alternator described in the document EP 0 881 752, which corresponds to U.S. Pat. No. 5,998,903, with a stator according to the invention equipped with a body comprising ninety six recesses; the winding being coupled to a bridge rectifier and/or control bridge for example as in the embodiments in FIGS. 8 to 17 of this document.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. A method for producing a stator for a rotary electrical machine comprising an annular body in the internal cylindrical face of which there are produced axial recesses and comprising a plurality of phase windings having conductors arranged in associated recesses in the annular body, wherein said method comprises the steps of:

a step of depositing conductors on a linear support of a principal longitudinal orientation, a top face of which comprises transverse recesses, comprising a first phase of depositing conductors in the recesses so as to form a first layer of conductors, and a second phase of depositing conductors in the recesses so as to form a second layer of conductors that is arranged vertically above the first layer, transferring the conductors, from the linear support, onto an annular support with transverse principal axis whose external cylindrical face comprises transverse recesses distributed angularly about a transverse principal axis of the annular support, so that the two layers of conductors form two coaxial spirals on the annular support, and transferring the conductors from the annular support onto the body of the stator, in which, for each winding, a first deposition phase and a second deposition phase comprises depositing one and the same conductor on the linear support, so that a first portion of the conductor partly forms the first layer of conductors and a second portion of the conductor partly forms the second layer of conductors.

2. The method according to claim 1, wherein said first deposition phase and the second deposition phase each consist, for each conductor, of successively filling the recesses in the linear support that are associated with the conductor, by introducing a roughly rectilinear transverse length of the conductor into an associated recess, folding and/or curving the conductor in order to form a longitudinal length that is situated transversely opposite a lateral vertical longitudinal face of the linear support, and introducing a consecutive transverse length into a consecutive associated recess, so that the conductor forms longitudinal undulations comprising a succession of transverse lengths that are received in the associated recesses and longitudinal lengths that are arranged alternately on each side of the linear support.

3. The method according to claim 1, wherein for each conductor, the first deposition phase consists of successively filling the associated recesses from upstream to downstream and the second deposition phase consists of successively filling the associated recesses from downstream to upstream.

4. The method according to claim 3, wherein said second deposition phase is implemented continuously after the first deposition phase, so that the two portions of the conductor are connected together at a downstream end of the linear support.

5. The method according to claim 4, wherein during the deposition step, all the conductors associated with the windings are deposited simultaneously on the longitudinal support so that, at the end of the winding step, the first portions of the conductors that form the first layer of conductors are roughly parallel and the second portions of the conductors that form the second layer of conductors are roughly parallel.

6. The method according to claim 3, wherein during the deposition step, all the conductors associated with the windings are deposited simultaneously on the longitudinal support so that, at the end of the winding step, the first portions of the conductors that form the first layer of conductors are roughly parallel and the second portions of the conductors that form the second layer of conductors are roughly parallel.

7. The method according to claim 1, wherein during the deposition step, all the conductors associated with the windings are deposited simultaneously on the longitudinal support so that, at the end of the winding step, the first portions of the conductors that form the first layer of conductors are roughly parallel and the second portions of the conductors that form the second layer of conductors are roughly parallel.

8. The method according to claim 1, wherein said first transfer step consists of successively transferring the transverse lengths that are received in the recesses in the linear support to the recesses in the annular support, by running the annular support onto the linear support, characterized in that the first transfer step consists of progressively transferring the transverse lengths of the conductors from a downstream end recess of the linear support as far as an upstream end recess in the linear support.

9. The method according to claim 1, wherein for each conductor, the deposition step consists of simultaneously depositing two electrically conductive wires on the linear support that form the conductor.

* * * * *